United States Patent [19]

Brown et al.

[11] 4,392,546
[45] Jul. 12, 1983

[54] SUSPENDED OPERATOR STATION

[75] Inventors: Ross K. Brown, Cedar Falls; Raymond D. Thompson, Waterloo; Terrill W. Woods; Darrell L. Wright, both of Cedar Falls, all of Iowa; James M. Conner, Old Greenwich, Conn.; William E. Crookes, Waldwick, N.J.; William F. Purcell, New York, both of N.Y.

[73] Assignee: Deere & Company, Moline, Ill.

[21] Appl. No.: 219,986

[22] Filed: Dec. 24, 1980

[51] Int. Cl.³ ............................................. B62D 33/06
[52] U.S. Cl. ................................. 180/326; 180/89.13
[58] Field of Search ............... 180/315, 326, 327, 329, 180/330, 334, 89.13, 89.1; 280/775; 296/65 R; 74/493

[56] References Cited

U.S. PATENT DOCUMENTS

| | | | |
|---|---|---|---|
| 3,357,717 | 12/1967 | Samford | 280/87 |
| 3,362,247 | 1/1968 | Watts | 280/775 X |
| 3,774,711 | 11/1973 | Lacey | 180/329 |
| 3,917,210 | 11/1975 | Miller | 248/419 |
| 3,922,030 | 11/1975 | Stedman | 296/65 A |
| 3,990,668 | 11/1976 | Thompson et al. | 248/400 |
| 3,999,800 | 12/1976 | Penzotti | 297/345 |
| 4,008,500 | 2/1977 | Hall | 9/7 |
| 4,026,379 | 5/1977 | Dunn et al. | 180/77 S |
| 4,055,230 | 10/1977 | Kestian | 180/89.1 |
| 4,059,171 | 11/1977 | Pakosh | 180/77 S |
| 4,062,588 | 12/1977 | Draney | 297/385 |
| 4,099,777 | 7/1978 | Chekirda | 297/375 |
| 4,128,217 | 12/1978 | Mazelsky | 244/122 R |
| 4,194,716 | 3/1980 | Barecki et al. | 248/575 |
| 4,195,883 | 4/1980 | Ronnhult et al. | 297/302 |
| 4,200,166 | 4/1980 | Hansen | 180/77 R |
| 4,228,984 | 10/1980 | Thompson et al. | 248/636 |
| 4,275,800 | 6/1981 | Batzel | 180/326 X |

FOREIGN PATENT DOCUMENTS

| | | | |
|---|---|---|---|
| 1932955 | 1/1971 | Fed. Rep. of Germany | . |
| 2307183 | 8/1974 | Fed. Rep. of Germany | 180/334 |
| 293729 | 4/1965 | Netherlands | 296/65 R |
| 1185848 | 3/1970 | United Kingdom | . |

Primary Examiner—John A. Pekar
Attorney, Agent, or Firm—Fraser and Bogucki

[57] ABSTRACT

A suspended operator station within the cab of a tractor or similar vehicle adjusts the height of the seat and thereafter the positions of the steering wheel, foot pedals and other controls relative to the seat for maximum visibility and comfort of operators of different size, and permits attenuated movement of the seat and controls together. The seat is mounted on a platform which is suspended above the cab floor by an attenuator assembly permitting limited, attenuated movement of the platform in a generally horizontal plane and a height adjustable support having vertical shock absorption and which positions the height of the seat for optimum visibility. The seat is mounted on the platform via tracks which permit fore-aft adjustment of the seat relative to controls coupled to the platform. In one embodiment a tiltable and telescoping steering wheel and foot pedals are mounted on a subfloor which is coupled to and adjustable in height relative to the platform. In an alternative embodiment the foot pedals are mounted on the platform and a tiltable and telescoping steering wheel is mounted on a console extending from the armrest of the seat.

22 Claims, 4 Drawing Figures

SUSPENDED OPERATOR STATION

BACKGROUND OF THE INVENTION

1. Field of the Invention

The present invention relates to the seating or other positioning of operators within vehicles, and more particularly to the positioning of an operator within the cab of a tractor or similar vehicle which can undergo substantial motion for optimum operator visibility and comfort.

2. History of the Prior Art

Vehicles designed principally for off-road use such as agricultural tractors have the potential of subjecting the operator thereof to substantial amounts of unpleasant motion because of the rough terrain which such vehicles must typically negotiate. In addition to some vibration, such vehicles sometimes subject the operator to constant pitching and jolting motions. The resulting operator fatigue can be a significant if not serious problem when it is considered that the operator typically operates such vehicles for extended time periods.

As a consequence, it has become commonplace to mount the operator seat in a tractor or other vehicle which undergoes substantial motion using a suspension of the type which permits attenuated motion. In addition, seats in vehicles of this type are often provided with various adjustments including the capability of swiveling so as to enhance operator comfort and convenience. Examples of such prior art seats are provided by U.S. Pat. Nos. 4,195,883, 4,128,217, 3,917,210, 3,922,030, 4,062,588, 3,999,800 and 4,099,777.

In addition to providing a movable seat suspension to minimize the effects of shocks and other undesirable motions, it is necessary to be able to position the seat relative to the various controls such as the steering wheel and foot pedals so that the operator can comfortably and confidently operate such controls. This is typically accomplished by making the seat both height-adjustable and adjustable in the fore-aft direction relative to the controls which are fixedly mounted to the interior of the cab of the vehicle. Such adjustments typically enable the operator to assume a convenient, comfortable position relative to the steering wheel, foot pedals and other controls, but often at the expense of good visibility from the cab. For example, the operator who is much taller than average must typically raise the height of the seat to properly position his feet relative to the foot pedals which are mounted at a fixed location on the cab floor. This may result in the operator being positioned high enough within the cab so as to seriously impair the operator's upward view and possibly even his view straight ahead from the cab. The smaller than average operator, on the other hand, tends to lower the height of the seat so as to bring his feet within a comfortable distance of the foot pedals, thereby impairing the operator's downward vision from the cab. In the case of either the tall operator or the smaller than average operator, adjustment of the seat height and fore-aft position to optimize control and comfort with respect to the foot pedals can result in certain other controls being awkward or inconveniently located.

Aside from the visibility problems noted, conventional seating and control arrangements may produce considerable operator fatigue despite the use of attenuated seat suspensions because of relative motion between the seat and thereby the operator who is positioned within the seat and the various controls which are typically mounted on or coupled to the fixed interior of the cab. As the vehicle undergoes vibration, shaking or other motion in response to uneven terrain and the like, the resulting movement of the seat may produce considerable motion between the operator and such things as the foot pedals, steering wheel and other controls. This relative motion is not only fatiguing but can result in sufficient loss of control so as to become a safety factor in some instances.

In an effort to provide improvement in seating accommodations for off-road vehicles and for other applications, a variety of different arrangements have been proposed. In one such arrangement shown in U.S. Pat. No. 3,357,717 of Samford, the seat and steering column assembly are both mounted on an integral platform which in turn is coupled to the flooring therebelow by arrangements of springs or other resilient elements. The seat is adjustable in the fore-aft direction, and the steering column assembly is tiltable and telescoping. In U.S. Pat. No. 4,059,171 of Pakosh, the steering column assembly and seat are also mounted on a common flat platform. The platform is coupled to the floor therebelow through a swivel and a fore-aft adjustment so that the entire platform can be rotated 180° to facilitate operation of the vehicle in opposite directions. U.S. Pat. No. 4,200,166 of Hansen and U.S. Pat. No. 4,026,379 of Dunn et al show seating arrangements in which some of the controls are incorporated into an armrest or console positioned adjacent the arm of the seat. U.S. Pat. No. 4,194,716 of Barecki et al shows a common seating arrangement for various types of vehicles in which the seat is mounted to the floor therebelow through an attenuating arrangement, a fore-aft adjustment mechanism and a scissors-type vertical height adjustment. U.S. Pat. No. 4,008,500, British Patent Specification No. 1,185,848 and German Pat. No. 1,932,955 show still other seating arrangements designed to fulfill various requirements.

None of the seating arrangements of the prior art including those shown in the above patents address the basic problem of optimizing the location of the operator within the cab for maximum visibility while at the same time optimizing operator comfort through not only attenuated, limited movement of the seat but at the same time minimization of motion of the controls relative to the operator.

Accordingly, it is an object of the invention to provide an improved operator station within a cab for agricultural tractors and similar vehicles.

It is a further object of the invention to provide an improved operator's station which optimizes the position of the operator for maximum visibility while at the same time providing comfort through controlled resistance to undesirable motion.

It is a further object of the invention to provide an improved operator's station within a cab which not only optimizes the viewing position of the operator but at the same time minimizes unwanted, fatiguing motion of the controls relative to the operator.

BRIEF DESCRIPTION OF THE INVENTION

These and other objects are accomplished in accordance with the invention by a suspended operator station in which both the seat and the controls are suspended for separate and independent movement within the cab. Initially, the height of the seat is adjusted until the operator achieves an optimum position in terms of visibility through the windshield and otherwise outside of the cab. Then the various controls have their positions relative to the seat adjusted so that the operator can reach and operate them comfortably. Relative movement between the controls and the operator is minimized or eliminated by mounting the controls and the seat on a common platform and then mounting the platform for limited, attenuated movement relative to the cab.

In a specific embodiment of a suspended operator station in accordance with the invention the seat is coupled through a swivel mechanism and a fore-aft adjustment to a platform suspended above the cab floor. The height of the seat is initially adjusted to optimize the viewing position of the operator by a height adjustable mechanism which is coupled between the platform and the cab floor and which at the same time provides limited, shock-absorbed vertical movement. With the seat so positioned, the various controls are then adjusted relative to the seat. A steering column assembly and foot pedals are mounted on a subfloor which is coupled to the platform through a mechanism which allows the height of the subfloor to be adjusted relative to the platform. At the same time the fore-aft adjustment of the seat relative to the platform further facilitates desired positioning of the controls relative to the operator. Relative movement between the controls and the operator is minimized or eliminated by coupling some of the controls such as the steering column assembly and the foot pedals to the seat through the subfloor and platform and by locating still other controls within a armrest mounted on the seat. At the same time limited, attenuated motion is provided to compensate for vibration, pitching and other unwanted motions through use of an attenuator mechanism which is coupled between the platform and the height adjusting mechanism and which permits limited, attenuated motion within a generally horizontal plane of the entire operator's station including the seat and all of the controls.

In an alternative embodiment of a suspended operator's station according to the invention, a platform is coupled through a swivel mechanism, an attentuator mechanism and a height adjustment mechanism to the cab floor, permitting rotation of the platform and limited, attenuated movement of the platform in a generally horizontal plane. Foot pedals are mounted on the platform together with the seat, the seat being coupled to the platform through a fore-aft adjustment mechanism. Some of the controls are incorporated in an armrest mounted on the seat, while still other controls including the steering wheel assembly are mounted on a console extending from and integral with the armrest. Initially, the height adjustment mechanism is used to adjust the height of the platform and thereby the seat for optimum operator viewing. Thereafter, the fore-aft position of the seat can be adjusted for optimum comfort and operation of the foot pedals. The steering column assembly which is tiltable and telescoping can also be adjusted to enhance operator comfort. The attenuator mechanism mounted between the platform and the cab floor permits limited, attenuated motion of the entire platform including the seat and the various controls to compensate for vehicle motion while at the same time preventing relative motion between the seat and the various controls.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
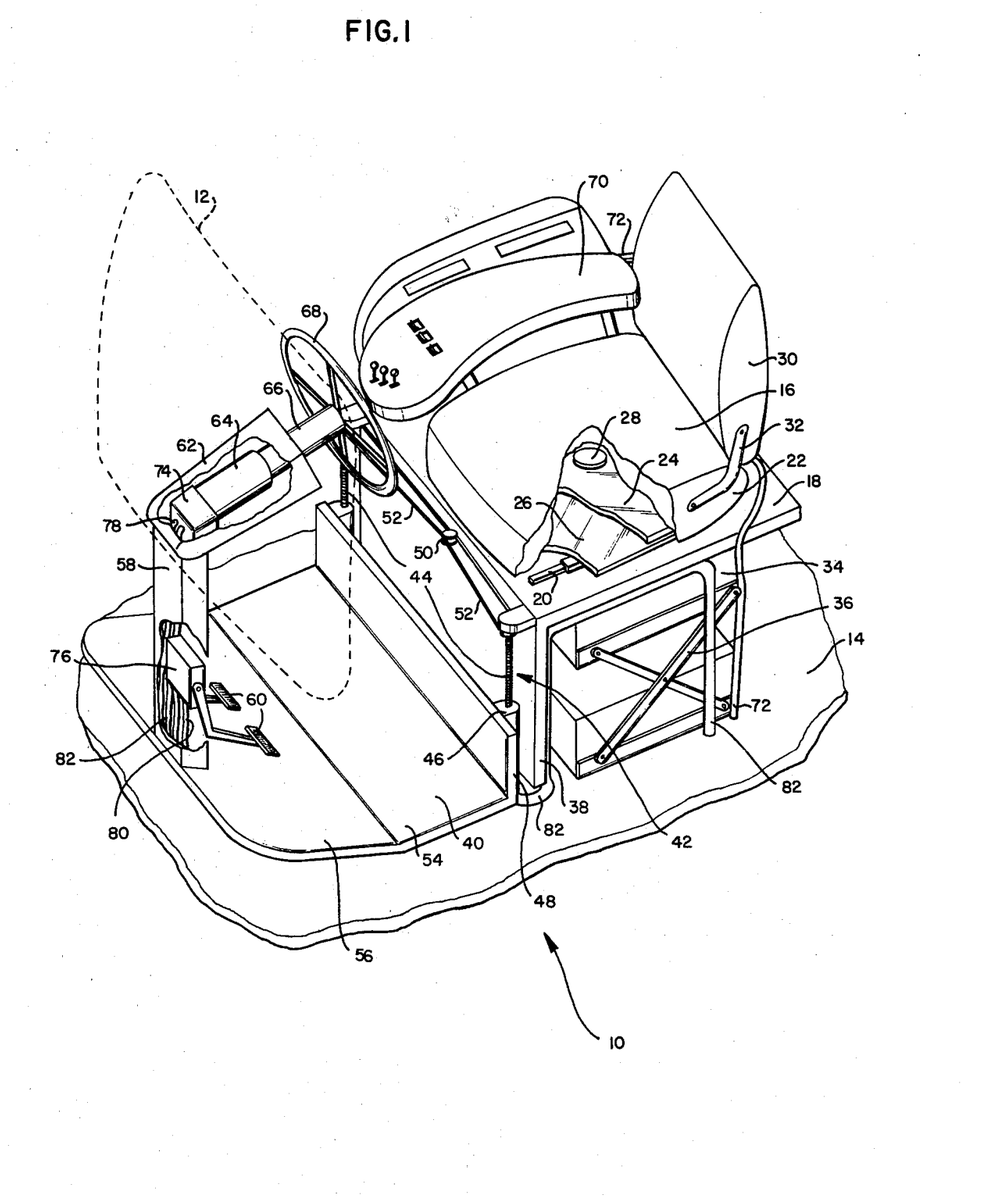
FIG. 1 is a perspective view, partly broken away, of one embodiment of a suspended operator station in accordance with the invention.

FIG. 1 depicts a suspended operator station 10 in accordance with the invention. The suspended operator station 10 is located within a vehicle cab 11 (shown in FIGS. 2 and 3) having a windshield 12 shown in dotted outline in FIG. 1 and a floor 14 forming a supporting surface for the operator station 10. In accordance with the invention the suspended operator station 10 adjusts the height of a seat 16 for optimum viewing by the operator through the windshield 12 with various controls then being adjusted relative to the seat 16 for maximum comfort and convenience.

The operator station 10 includes a suspended platform 18 which mounts the seat 16 thereon via a pair of conventional seat sliders 20, one of which is shown in FIG. 1. The seat sliders 20 which provide for adjustable fore-aft movement of the seat 16 relative to the platform 18 may be of conventional design as shown, for example, in U.S. Pat. No. 3,999,800 which is incorporated herein by reference.

The seat 16 includes a seat cushion 22 at the base thereof which is partly broken away in FIG. 1 to show a seat plate 24 at the bottom of the cushion 22 and a base plate 26 beneath the seat plate 24. The base plate 26 is mounted on the seat sliders 20 so as to be movable with the sliders 20 in the fore-aft direction. The seat plate 24 is pivotably mounted on the base plate 26 via a conventional swivel assembly 28 to permit the entire seat 16 to rotate relative to the base plate 26. The swivel assembly 28 may be of any appropriate conventional design and preferably is of the type having a lockout control so that the seat 16 may be locked at a desired angular attitude relative to the base plate 26 as shown, for example, by previously referred to U.S. Pat. No. 3,922,030 which is incorporated herein by reference. In addition to the seat cushion 22, the seat 16 has a backrest 30 coupled to the seat cushion 22 via brackets 32.

The platform 18 is coupled to the cab floor 14 via an attenuator assembly 34 and a height adjustable support 36. The attenuator assembly 34 permits limited, attenuated movement of the platform 18 and thus the seat 16 which is mounted thereon in response to motion of the vehicle and its cab of the type which would otherwise produce operator fatigue. The attenuator assembly 34 may be of the unit directional type as shown for example by a co-pending application Ser. No. 960,125, filed Nov. 13, 1978, now U.S. Pat. No. 4,228,984, and assigned to the assignee of the present application. Attenuator units of the unit directional type permit limited, attenuated movement of the attached seat or other structure along a single axis, usually in the fore-aft direction. For improved operation however, the attenuator unit 34 is preferably of the type shown in co-pending application Ser. No. 219,987, filed Dec. 24, 1980, and commonly assigned with the present application. That application describes an attenuator assembly the internal mechanism of which is capable of movement along two perpendicular axes extending in the fore-aft and lateral directions with the result that the seat or other structure supported thereby is capable of undergoing limited, attenuated movement in a generally horizontal plane.

The height adjustable support 36 is of appropriate conventional design such as the scissors-type suspension currently used with tractor seats. Such suspensions typically employ hydraulics in connection with a scissors mechanism to adjust the height of the seat and thereafter provide shock absorbing control of limited vertical movement of the seat. An example of a hydraulic suspension which can be used is provided by U.S. Pat. No. 3,990,668 which is incorporated herein by reference.

The platform 18 includes a downwardly extending portion 38 at the front of the seat 16 for mounting a subfloor 40 forming a part of the suspended platform 18. The subfloor 40 is adjustable in height relative to the platform 18 and its downwardly extending portion 38 by a height adjusting mechanism 42 which includes an opposite pair of worm drives 44. Each worm drive 44 is pivotably mounted at the top and bottom of the downwardly extending portion 38 and threadingly engages a socket 46 formed on the back of an upwardly extending lip 48 on the subfloor 40. Upward and downward movement of the subfloor 40 is provided by rotation of the worm drives 44 in response to rotation of pulleys 50 coupled to the worm drives 44 via belts 52. The pulleys 50 are driven via a motor (not shown). The height adjusting mechanism 42 is shown and described by way of example only, and other appropriate arrangements can be used to mount and adjust the height of the subfloor 40.

The subfloor 40 has a generally horizontal portion 54 extending outwardly from the lip 48 and terminating in an inclined portion 56. A post 58 extends generally vertically upwardly from a central portion of the upper end of the inclined portion 56 and mounts a plurality of foot pedals 60 adjacent the lower end thereof. The post 58 terminates in a steering column assembly 62 which is pivotably attached to the upper end of the post 58 via a conventional tilting mechanism and which includes a conventional telescoping column mechanism 64 for axial adjustment of a column 66 which mounts a steering wheel 68.

Accordingly, the foot pedals 60 and the steering column assembly 62 which are mounted on the subfloor 40 form a part of the suspended platform 18 so as to move up and down with the platform 18 as the height of the seat 16 is adjusted via the height adjustable support 36. The remaining controls are located within an armrest 70 mounted on the seat 16 so as to also be integral with the seat 16 and its platform 18. The armrest 70 may include some instruments but in any event includes all or substantially all controls which must be operated by hand including preferably a single control capable of adjusting the height adjustable support 36, the height adjusting mechanism 42 and the seat sliders 20 with power assist in response to motions of the single control in different directions. This locates all of the controls so that they move with the seat 16 as the seat undergoes motion relative to the cab floor 14 via the attenuator assembly 34, thereby eliminating an important source of fatigue in the form of movement of the controls which are typically mounted on the cab interior relative to the operator and his seat.

The various controls located in the armrest 70 are coupled to the cab via a flexible cable bundle 72. The bundle 72 contains mostly electrical wires due to the electrical nature of most of the armrest controls, but may contain hydraulic and pneumatic lines as necessary. The cable bundle 72 extends from the armrest 70 across the platform 18 and then down to the cab floor 14 with enough slack to accommodate adjustment of the height adjustable support 36. After passing through the cab floor 14 the various wires and lines of the cable bundle 72 extend and couple to the appropriate mechanisms on the vehicle.

The steering wheel 68 couples via the column 66 and the telescoping column mechanism 64 to a metering pump 74 at the top of the post 58. The foot pedals 60 are coupled to a master cylinder 76 within the post 58. The metering pump 74 and the master cylinder 76 are coupled to the cab via hydraulic lines 78 and 80 respectively which are formed into a bundle 82 at the base of the post 58. The bundle 82 which is flexible extends across the underside of the subfloor 40 from which it exits to the back of the downwardly extending portion 38 of the platform 18 with enough slack to permit vertical movement of the subfloor 40 via the height adjusting mechanism 42. From the back of the downwardly extending portion 38, the bundle 82 extends along the underside of the platform 18 from which it exits to the cab floor 14 with enough slack to accommodate adjustment of the height adjustable support 36. After passing through the cab floor 14, the lines 78 from the metering pump 74 connect to a hydraulic steering motor. The lines 80 from the master cylinder 76 connect to a slave cylinder for the brake system. A clutch pedal may be mounted on or adjacent the post 58 from which it is coupled to control the clutch via a master-slave cylinder arrangement.

As previously noted the height adjustable support 36 is initially used to position the operator at an optimum viewing position by adjusting the height of the seat 16 relative to the cab floor 14. When this is accomplished, other adjustments are made as necessary to optimize the positioning of the various controls for the particular operator. The height adjusting mechanism 42 is used to adjust the height of the subfloor 40 so that the subfloor 40 and the foot pedals 60 are at a comfortable height for the operator. The operator is moved closer to or further away from the foot pedals 60 by fore-aft adjustment of the seat 16 using the seat sliders 20. Finally, the steering column assembly 62 is tilted and the column 66 thereof telescoped as necessary to comfortably position the steering wheel 68 for the operator.

Figure 2:
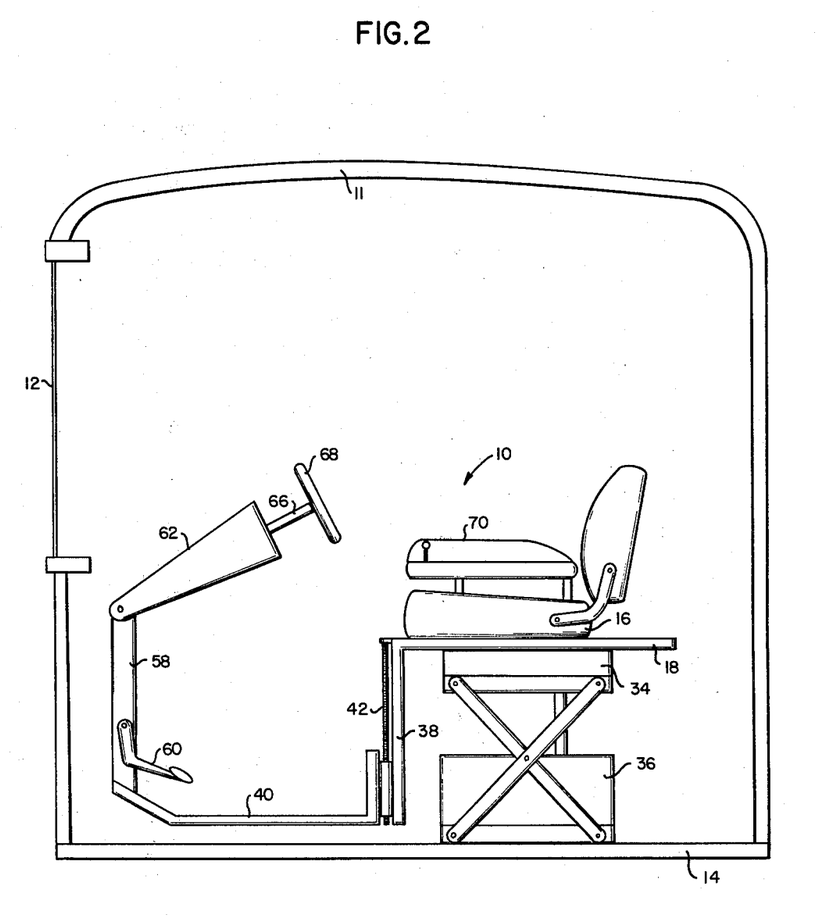
FIG. 2 is a side elevation of the suspended operator station of FIG. 1 illustrating adjustment of various parts thereof to accommodate a tall operator.
Figure 3:
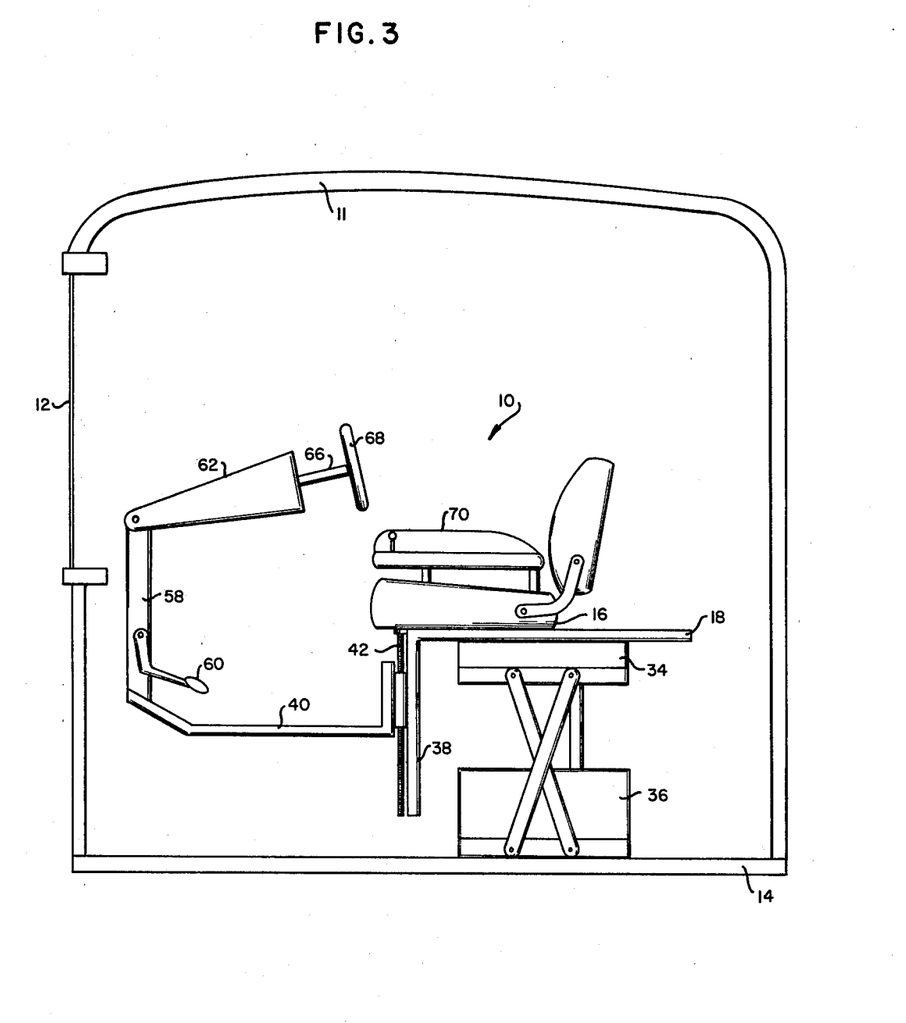
FIG. 3 is a side elevation of the suspended operator station of FIG. 1 illustrating adjustment of various parts thereof to accommodate a short operator.

The manner in which the various adjustments just described are made for operators of different size can be better appreciated with reference to FIGS. 2 and 3. FIG. 2 depicts the typical positioning of the various components of the suspended operator station 10 for a tall operator. The platform 18 and attached seat 16 have been lowered relative to the cab floor 14 via the height adjustable support 36 to a relatively low position in which the operator's eyes are at the proper level relative to the windshield 12. To accommodate the longer legs of the tall operator, the height adjusting mechanism 42 has been adjusted to position the subfloor 40 and the included foot pedals 60 at a relatively low position on the downwardly extending portion 38 of the platform 18. At the same time the seat 16 has been moved back and away from the foot pedals 60 using the adjustable seat sliders 20. The steering column assembly 62 has been tilted upwardly and the telescoping column mechanism 64 adjusts as necessary to bring the steering wheel 68 up and within easy, comfortable reach of the operator's hands. As bumps are encountered during operation of the vehicle the attenuator assembly 34 permits the entire suspended operator station 10 including the seat 16, the subfloor 40, the foot pedals 60, the steering column assembly 62 and the armrest 70 to move integrally and as one, thereby eliminating unwanted movement of the controls relative to the operator. The shock absorbing piston within the height adjustable support 36 provides limited, attenuated vertical movement of the entire suspended operator station 10 in response to bumps and other severe motions.

FIG. 3 depicts the typical positioning of the various parts of the suspended operator station 10 in the case of a relatively small, short operator. The height adjustable support 36 has been raised to increase the height of the seat 16 above the cab floor 14 for proper eye positioning of the operator relative to the windshield 12. The subfloor 40 has been raised upwardly relative to the downwardly extending portion 38 of the platform 18 via the height adjusting mechanism 42, and at the same time the seat 16 has been moved forward along the platform 18 via the adjustable seat sliders 20. The steering column assembly 62 has been tilted downwardly and the telescoping column mechanism 64 thereof adjusted as necessary to comfortably position the steering wheel 68 within easy reach of the operator.

Figure 4:
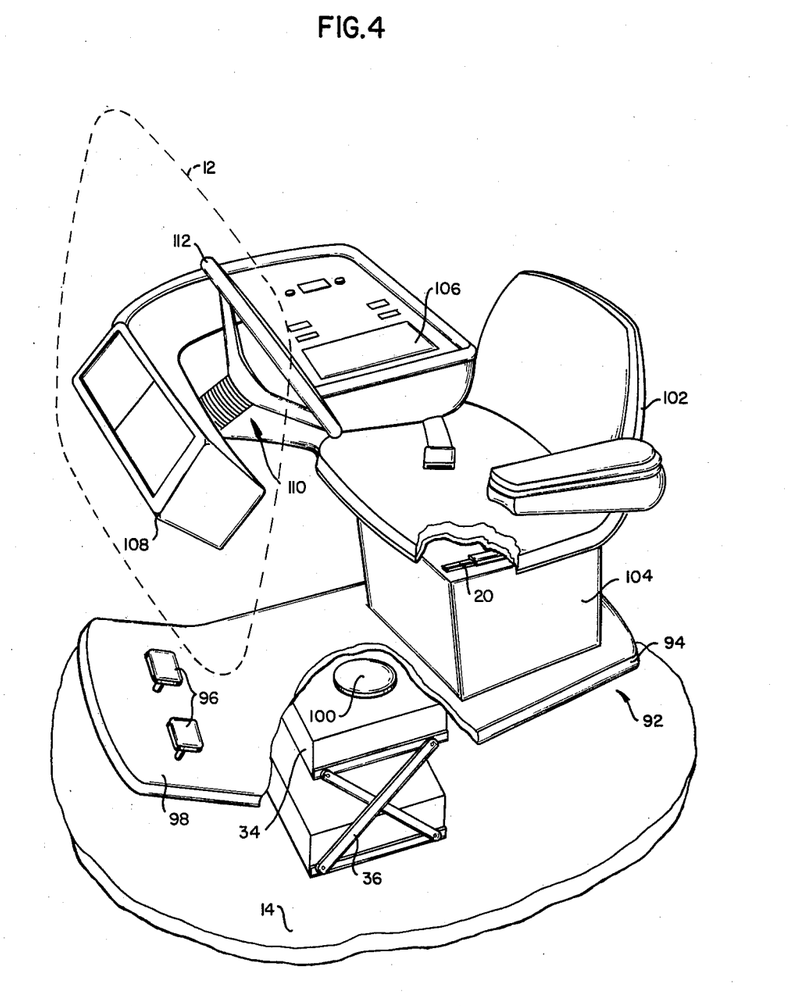
FIG. 4 is a perspective view, partly broken away, of an alternative embodiment of a suspended operator station in accordance with the invention.

FIG. 4 depicts an alternative embodiment of a suspended operator station 92 in accordance with the invention. The suspended operator station 92 is similar to the operator station 10 of FIGS. 1-3 in that it employs the height adjustable support 36 mounted on the cab floor 14 and the attenuator assembly 34 mounted on top of the height adjustable support 36. In the operator station 92, the platform 18 of FIGS. 1-3 is replaced by a platform 94 of large enough size to include the subflooring area for the operator and a plurality of foot pedals 96. The platform 94 which is essentially flat and horizontally disposed and which has an inclined portion 98 in the region of the foot pedals 96 is rotatably mounted on the attenuator assembly 34 via a swivel assembly 100. The swivel assembly 100 may be identical to the swivel assembly 28 of FIG. 1, but preferably is of larger and sturdier construction because of the additional mass that must be supported in the operator station 92.

The operator station 92 includes a seat 102 which is similar in configuration to the seat 16 of FIGS. 1-3. The seat 102 is coupled to a support base 104 at the end of the platform 94 opposite the foot pedals 96 via the seat sliders 20. The seat 102 has an armrest 106 mounted thereon which is similar to the armrest 70 of FIGS. 1-3 in that it contains many of the manually operable controls coupled via a flexible cable bundle to the cab. In addition, the armrest 106 terminates in a console 108 extending outwardly from the armrest 106 across the front of the seat 102. The console 108 mounts a steering column assembly 110 which may be similar in design to and coupled to the cab in essentially the same way as the steering column assembly 62 of FIGS. 1-3. The steering column assembly 110 includes conventional tilting and telescoping mechanisms.

The operator station 92 of FIG. 4 is well suited to those applications where it is desirable to be able to position the seat at different angular positions within the cab for different operations. The mounting of the swivel assembly 100 between the attenuator assembly 34 and the platform 94 allows the entire operator station 92 to rotate within the cab. This requires a relatively large cab because of the interior space required as the operator station 92 rotates to various different positions. At the same time the advantages of the embodiment of FIGS. 1-3 of optimum eye position and optimum control position are realized. The height adjustable support 36 is used to initially position the height of the seat 102 for optimum visibility relative to the windshield 12. The fore-aft position of the seat 102 is then adjusted via the seat sliders 20 to position the foot pedals 96 relative to the operator. The operator station 92 does not have the floor and pedal height adjustment provided by the height adjusting mechanism 42 in the operator station 10 of FIGS. 1-3. However the fore-aft adjustability provided by the seat sliders 20 provide for reasonably comfortable positioning of the foot pedals 96 and the subfloor defined by the platform 94 for a variety of different operator sizes. The steering column assembly 110 is tilted and telescoped as necessary to bring a steering wheel 112 thereof into a comfortable position for the operator.

As the vehicle encounters bumps and otherwise undergoes severe motions, the attenuator assembly 34 allows limited, attenuated movement in a generally horizontal plane of the entire operator station 92 including the seat 102, the foot pedals 96, the armrest 106 and the console 108 with its included steering column assembly 110. As in the case of the operator station 10 of FIGS. 1-3, the foot pedals 96, the steering wheel 112 and the various controls mounted on the armrest 106 remain in fixed positions relative to the operator as the limited, attenuated motion occurs.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A suspended operator station comprising the combination of:
   a platform mounted on a supporting surface;
   means for adjusting the height of the platform relative to the supporting surface, the means for adjusting being capable of moving the platform along a generally vertical axis to different heights;
   a seat mounted on the platform;
   a cab mounted on the supporting surface and surrounding and being disposed adjacent the platform and the seat; a plurality of controls; and
   means for adjusting the positions of the controls relative to the seat.

2. The invention set forth in claim 1, further comprising means for permitting at least the seat to undergo rotational motion relative to the supporting surface.

3. The invention set forth in claim 1, further comprising means for adjusting the position of the seat in a fore-aft direction relative to the platform.

4. The invention set forth in claim 1, further comprising means for permitting limited movement of the platform relative to the supporting surface along a generally vertical axis.

5. The invention set forth in claim 1, wherein the plurality of controls includes a tiltable and telescoping steering column assembly.

6. The invention set forth in claim 1, further comprising an armrest mounted on the seat and including at least some of the plurality of controls.

7. The invention set forth in claim 6, further comprising a steering column assembly mounted on the armrest.

8. A suspended operator station comprising the combination of:
- a platform mounted on a supporting surface;
- means for adjusting the height of the platform relative to the supporting surface;
- a seat mounted on the platform;
- a plurality of controls;
- means for adjusting the positions of the controls relative to the seat; and
- means for permitting movement of the platform substantially exclusively in a generally horizontal plane.

9. A suspended operator station comprising the combination of:
- a platform mounted on a supporting surface;
- means for adjusting the height of the platform relative to the supporting surface;
- a seat mounted on the platform;
- a plurality of controls;
- means for adjusting the positions of the controls relative to the seat;
- a subfloor coupled to the platform; and
- means for adjusting the height of the subfloor relative to the platform;
- and wherein the plurality of controls includes a steering column assembly mounted on the subfloor.

10. A suspended operator station comprising the combination of:
- a cab having a windshield and a floor at fixed locations;
- a height adjustable support mounted on the cab floor;
- a seat coupled to the height adjustable support;
- the height adjustable support including means capable of moving the seat along a generally vertical axis to adjust the height thereof relative to the floor;
- a plurality of controls coupled to the seat and suspended above the cab floor; and
- means for adjusting the positions of the controls relative to the seat;
- the height adjustable support and the means capable of moving positioning the seat to dispose an operator at a desired location relative to the cab windshield and the means for adjusting the position of the controls positioning the controls at a desired location relative to the operator.

11. The invention set forth in claim 10, further including an armrest mounted on the seat and a second plurality of controls mounted on the armrest.

12. The invention set forth in claim 10, further including a plurality of tracks disposed between the seat and the height adjustable support to permit adjustable fore-aft movement of the seat relative to the plurality of controls.

13. The invention set forth in claim 10, further including a swivel assembly disposed between the seat and the height adjustable support to permit rotational movement of the seat.

14. The invention set forth in claim 10, further including an attenuator assembly disposed between the seat and the height adjustable support and operative to permit limited, attenuated movement of the seat and the plurality of controls relative to the height adjustable support substantially exclusively in a generally horizontal plane.

15. The invention set forth in claim 10, further including a subfloor coupled to the seat and suspended above the cab floor, and wherein the plurality of controls includes a steering column assembly mounted on the subfloor and at least one foot pedal coupled to the subfloor.

16. A suspended operator station comprising the combination of:
- a cab having a windshield and a floor at fixed locations;
- a height adjustable support mounted on the cab floor;
- a seat coupled to the height adjustable support;
- a plurality of controls coupled to the seat and suspended above the cab floor;
- means for adjusting the positions of the controls relative to the seat;
- the height adjustable support positioning the seat to dispose an operator at a desired location relative to the cab windshield and the means for adjusting the position of the controls positioning the controls at a desired location relative to the operator;
- a subfloor coupled to the seat and suspended above the cab floor;
- wherein the plurality of controls includes a steering column assembly mounted on the subfloor and at least one foot pedal coupled to the subfloor; and
- means for adjusting the height of the subfloor relative to the seat.

17. A suspended operator station comprising the combination of:
- a cab having a windshield and a floor at fixed locations;
- a height adjustable support mounted on the cab floor;
- a platform mounted on the height adjustable support;
- the height adjustable support including means capable of moving the platform along a generally vertical axis to adjust the height thereof relative to the floor;
- at least one control coupled to the platform;
- a seat mounted on the platform; and
- means coupled between the seat and the platform for permitting adjustable fore-aft movement of the seat relative to the at least one control;
- the height adjustable support positioning the platform and thereby the seat to dispose an operator at a desired location relative to the cab windshield and the means for permitting adjustable fore-aft movement of the seat positioning the seat at a desired location relative to the at least one control.

18. The invention set forth in claim 17, further including a swivel assembly disposed between the platform and the height adjustable support to permit rotational movement of the platform.

19. The invention set forth in claim 17, wherein the at least one control comprises a foot pedal, and further comprising an armrest mounted on the seat and a control console coupled to the armrest.

20. The invention set forth in claim 19, further including a steering column assembly mounted on the control console.

21. The invention set forth in claim 20, wherein the steering column assembly is tiltable and telescoping.

22. A suspended operator station comprising the combination of:
- a cab having a windshield and a floor at fixed locations;
- a height adjustable support mounted on the cab floor;
- a platform mounted on the height adjustable support;
- at least one control coupled to the platform;
- a seat mounted on the platform;
- means coupled between the seat and the platform for permitting adjustable fore-aft movement of the seat relative to the at least one control;
- the height adjustable support positioning the platform and thereby the seat to dispose an operator at a desired location relative to the cab windshield and the means for permitting adjustable fore-aft movement of the seat positioning the seat at a desired location relative to the at least one control; and
- an attenuator assembly disposed between the platform and the cab floor and operative to permit limited, attenuated movement of the platform and the included seat and at least one control relative to the height adjustable support substantially exclusively in a generally horizontal plane.

* * * * *